United States Patent [19]
Keiichi et al.

[11] Patent Number: 6,150,439
[45] Date of Patent: Nov. 21, 2000

[54] BLOCK COPOLYMER COMPOSITION FOR MODIFYING ASPHALT AND ASPHALT COMPOSITION COMPRISING THE SAME

[75] Inventors: Toda Keiichi; Nakamichi Yukinori, both of Ooita, Japan

[73] Assignee: Japan Elastomer Co., Ltd., Tokyo, Japan

[21] Appl. No.: 09/263,351

[22] Filed: Mar. 5, 1999

[30] Foreign Application Priority Data

Mar. 5, 1998 [JP] Japan .................................. 10-069261

[51] Int. Cl.$^7$ ...................................................... C08L 95/00
[52] U.S. Cl. ................................................. 524/68; 524/59
[58] Field of Search ......................................... 524/68, 59

[56] References Cited

FOREIGN PATENT DOCUMENTS

| | | | |
|---|---|---|---|
| 27 09 289 | 9/1977 | Germany | ................................. 524/68 |
| B2-2612588 | 10/1989 | Japan . | |
| 143961 | 6/1991 | Japan | ...................................... 524/68 |
| 6-41439 | 2/1994 | Japan . | |
| 8-100126 | 4/1996 | Japan . | |
| 8-301929 | 11/1996 | Japan . | |
| 9-012898 | 1/1997 | Japan . | |
| 10-212416 | 8/1998 | Japan . | |

*Primary Examiner*—Peter A. Szekely
*Attorney, Agent, or Firm*—Pennie & Edmonds LLP

[57] ABSTRACT

A block copolymer composition for modifying asphalt, which comprises a mixture of: (A) a block copolymer comprising: at least two polymer blocks each mainly comprising a monoalkenyl aromatic compound; and at least one polymer block mainly comprising a conjugated diene compound; and (B) a block copolymer comprising: at least one polymer block mainly comprising a monoalkenyl aromatic compound; and at least one copolymer block mainly comprising a conjugated diene compound, and having a molecular weight equivalent to $\frac{1}{3}$ to $\frac{2}{3}$ of the molecular weight of block copolymer (A), wherein (a) the total bonding alkenyl aromatic compound content in the mixture of block copolymers (A) and (B) is from 10 to 50% by weight, wherein (b) the vinyl bond content in the conjugated diene polymer blocks is not greater than 70% by weight, and wherein the block copolymer composition has: (c) a content of (A) component is from 98 to 20% by weight and a content of (B) component is from 2 to 80% by weight; (d) a melt index value of from 0.3 to 15.0 g/10 min; (e) a bulk density of from 0.1 to 0.7; (f) a particle size distribution such that the content of constituents remaining on a 5-mesh sieve is not greater than 30% by weight and the content of constituents passing through a 20-mesh sieve is not greater than 30% by weight; and (g) a total pore volume of from 100 to 2,000 mm$^3$/g.

4 Claims, No Drawings

BLOCK COPOLYMER COMPOSITION FOR MODIFYING ASPHALT AND ASPHALT COMPOSITION COMPRISING THE SAME

FIELD OF THE INVENTION

This invention relates to a monoalkenyl aromatic compound/conjugated diene block copolymer composition.

Particularly, this invention provides an asphalt composition which has high softening point, excellent ductility, excellent balance between physical properties such as mechanical strength and workability, and excellent storage stability. Such an asphalt composition is suitably used, for example, for draining pavement. The present invention also provides a block copolymer composition for modifying asphalt for use in the provision of the asphalt composition, which has a specific structure and a specific form as an asphalt-modifying agent and has markedly excellent solubility in asphalt.

BACKGROUND OF THE INVENTION

Asphalt compositions have been finding versatile use in such applications as road paving, waterproof sheets, sound insulation sheets, roofing and the like. In such cases, a number of attempts have been made to improve properties of asphalt by adding various polymers. Regarding illustrative examples of such polymers, ethylene-vinyl acetate copolymers, ethylene-ethyl acrylate copolymers, rubber latex, block copolymers comprising butadiene and a vinyl aromatic hydrocarbon and the like are used.

However, ethylene-vinyl acetate copolymers and ethylene-ethyl acrylate copolymers are not desirable, because low temperature characteristics of the resulting asphalt compositions are poor, which causes generation of cracks in winter. In addition, since they have poor ductility characteristics, their caking power (tenacity) is also poor so that they show poor aggregate grasping characteristics in the case of road paving.

In the case of rubber latex, it has economical or process problems such as the necessity to carry out excess heating for the evaporation of water contained in latex.

In recent years, a demand for the maintenance of superior strength and wear resistance has been increasing because of heavy traffic roads and highways due to increasing number of road-passing cars or acceleration of traffic. In addition, another demand has also been increasing for a high performance asphalt composition (an asphalt binder for draining pavement use) for the purpose of improving drainage property and reducing ambient noises in constructing a pavement having high void ratio, so that more high softening point and mechanical strength such as toughness and tenacity have been in demand.

Furthermore, some new problems have been found such as poor storage stability of asphalt compositions after storage over a long period of time. The wording "poor storage stability" as used herein means a phenomenon in which the performance such as softening point wholly reduced, or phase separation in which the performance becomes different between the upper layer and the lower layer, takes place after high temperature storage. Such phenomena have not been solved and posing serious problems. In order to solve these problems, attempts have been made to improve asphalt compositions, for example, by increasing molecular weight of the aforementioned block copolymer. However, though simple increase in the molecular weight can improve mechanical strength, melt viscosity becomes high and causes new problems such as considerable sacrifice of workability in road paving and the like. Regarding the storage stability, increment of molecular weight causes sharp reduction of stability so that its improving effect cannot be found.

As a high performance asphalt composition having more high softening point, an asphalt composition to which a block copolymer having a specific molecular structure was added has been proposed as disclosed in JP-A-6-041439 (The term "JP-A" as used herein means an "unexamined published Japanese patent application"). This composition has high softening point, penetration and ductility and excellent cold resistance and workability, but its storage stability is not improved so that it cannot be used when storage stability is required.

Thus, there is no conventional asphalt composition to which various polymers are added and which satisfies high softening point, penetration and ductility and high degree balance with workability, and also has excellent storage stability, so that there is a strong demand for such an asphalt composition.

SUMMARY OF THE INVENTION

The present invention has been made to solve the above-described problems in the conventional asphalt compositions.

It is, therefore, an object of the present invention to provide an asphalt composition which shows excellent physical properties such as high softening point, ductility, mechanical strength and the like, and which has excellent storage stability.

Another object of the present invention is to provide a block copolymer composition for use in the provision of the asphalt composition as an asphalt-modifying agent which has markedly excellent solubility in asphalt and also shows excellent workability later.

Other objects and effects of the present invention will become apparent from the following description.

In order to develop an asphalt-modifying agent which has the above described performances and a modifying asphalt composition using the same, the inventors of the present invention have made extensive studies. As a result, it was found that the above-described objects of the present invention (i.e., an asphalt composition which has excellent solubility and workability, which is also excellent in terms of softening point, ductility and mechanical strength and, moreover, which shows excellent storage stability so that these properties can be maintained even when stored) can be achieved by the addition of a specific amount of a block copolymer composition comprising an alkenyl aromatic compound and a conjugated diene and having extremely limited ranges of structure and shape, as an asphalt-modifying agent. The present invention has been accomplished based on this finding.

That is, the above-described objects of the present invention have been achieved by providing the following block copolymer compositions and asphalt compositions.

1) A block copolymer composition for modifying asphalt, which comprises a mixture of:

(A) a block copolymer comprising:
  at least two polymer blocks each mainly comprising a monoalkenyl aromatic compound; and
  at least one polymer block mainly comprising a conjugated diene compound; and (B) a block copolymer comprising:
   at least one polymer block mainly comprising a monoalkenyl aromatic compound; and
   at least one copolymer block mainly comprising a conjugated diene compound, and having a molecular weight equivalent to $1/3$ to $2/3$ of the molecular weight of block copolymer (A),
wherein (a) the total bonding alkenyl aromatic compound content in the mixture of block copolymers (A) and (B) is from 10 to 50% by weight,
wherein (b) the vinyl bond content in the conjugated diene polymer blocks is not greater than 70% by weight, and
wherein the block copolymer composition has:
   (c) a content of (A) component is from 98 to 20% by weight and a content of (B) component is from 2 to 80% by weight;
   (d) a melt index value of from 0.3 to 15.0 g/10 min;
   (e) a bulk density of from 0.1 to 0.7;
   (f) a particle size distribution such that the content of constituents remaining on a 5-mesh sieve is not greater than 30% by weight and the content of constituents passing through a 20-mesh sieve is not greater than 30% by weight; and
   (g) a total pore volume of from 100 to 2,000 mm$^3$/g.

2) The block copolymer composition of the above 1), wherein the block copolymer mixture has a softening temperature of from 80 to 130° C. as measured by static thermomechanical analysis (TMA).

3) The block copolymer composition of the above 1) or 2), having a content of the monoalkenyl aromatic compound polymer blocks (BS) of from 10 to 48% by weight, and an alkenyl aromatic compound content (TS-BS) calculated by subtracting the monoalkenyl aromatic compound polymer block content (BS) from the total bonding alkenyl aromatic compound content (TS) is from 2 to 30% by weight.

4) The block copolymer composition of any one of the above 1) to 3), wherein component (A) comprises a coupling polymer obtained by coupling reaction of component (B).

5) An asphalt composition comprising:
   from 3 to 15 parts by weight of the block copolymer composition of any one of the above 1) to 4); and
   from 85 to 97 parts by weight of asphalt.

DETAILED DESCRIPTION OF THE INVENTION

Component (A) (block copolymer (A)) for use in the present invention is a block copolymer comprising at least two polymer blocks each mainly comprising a monoalkenyl aromatic compound; and at least one polymer block mainly comprising a conjugated diene compound.

Component (B) (block copolymer (B)) for use in the present invention is a block copolymer comprising at least one polymer block mainly comprising a monoalkenyl aromatic compound and at least one copolymer block mainly comprising a conjugated diene compound.

The polymer block mainly comprising a monoalkenyl aromatic compound is a polymer block substantially comprising a monoalkenyl aromatic compound as the main component, which contains 50% by weight or more of the monoalkenyl aromatic compound. Also, the polymer block mainly comprising a conjugated diene is a polymer block substantially comprising a conjugated diene as the main component, which contains 50% by weight or more of the conjugated diene.

Examples of the monoalkenyl aromatic compound for use in the block copolymer composition of the present invention include monomers such as styrene, p-methylstyrene, tert-butylstyrene, α-methylstyrene, 1,1-diphenylethylene. Of these, styrene is preferred. These monomers may be used alone or as a mixture of two or more thereof.

On the other hand, examples of the conjugated diene include monomers such as 1,3-butadiene, isoprene, 2,3-dimethyl-1,3-butadiene, piperylene, 3-butyl-1,3-octadiene, phenyl-1,3-butadiene. Of these, 1,3-butadiene and isoprene are preferred. These monomers may be used alone or as a mixture of two or more thereof.

The peak molecular weight of component (B) as measured by a gel permeation chromatography (GPC) is from $1/3$ to $2/3$ of the peak molecular weight of component (A) measured in the same manner. When it is less than $1/3$, melt viscosity becomes low and workability therefore becomes excellent, but cohesive force, softening point and ductility become poor. Also, when it is larger than $2/3$, softening point becomes high, but melt viscosity of the asphalt composition becomes high, which is not desirable in terms of workability.

Supposing that S represents the polymer block mainly comprising a monoalkenyl aromatic compound and B represents the polymer block mainly comprising a conjugated diene, examples of the structure of component (A) include SBS, SBSB, SBSBS, (SB)$_2$X, (SB)$_3$X, (SB)$_4$X, (SBS)$_2$X, (SBS)$_3$X, (SBS)$_4$X, wherein X is a coupling agent residue. Among these structures, (SB)$_2$X and SBS are desirable from the viewpoint of their performances, and (SB)$_2$X is particularly desirable in view of its performance and productivity. Examples of the structure of component (B) include SB, SBS, SBSB, SBSBS, (SB)$_2$X, (SB)$_3$X, (SB)$_4$X, (SBS)$_2$X, (SBS)$_3$X, (SBS)$_4$X, wherein X is a coupling agent residue. Among these structures, SB, (SB)$_2$X and SBS are desirable from the viewpoint of their performances, and SB is particularly desirable in view of its performance and productivity.

In the block copolymer composition of the present invention, the content of component (A) is from 98 to 20% by weight and the content of component (B) is from 2 to 80% by weight. Contents outside these ranges will not bear highly balanced physical properties among melt viscosity, softening point and ductility. The content of component (B) is preferably from 5 to 60% by weight, more preferably from 10 to 40% by weight.

The content of the monoalkenyl aromatic hydrocarbon in the block copolymer composition of the present invention is from 10 to 50% by weight. When the content of monoalkenyl aromatic hydrocarbon is less than 10% by weight, cohesive force of the monoalkenyl aromatic hydrocarbon polymer block becomes insufficient and the mechanical strengths such as toughness and tenacity becomes inferior. When it exceeds 50% by weight, storage stability is considerably deteriorated, which is not desirable.

This also causes poor workability when an asphalt mixture is produced, because the time for dissolving and dispersing the composition in asphalt is prolonged. Furthermore, low temperature characteristics of the asphalt mixture is deteriorated. Preferably, the content of monoalkenyl aromatic hydrocarbon is within the range of from 15 to 45% by weight, more preferably from 20 to 40% by weight.

The content of monoalkenyl aromatic compound polymer block in the block copolymer composition is preferably from not less than 10% by weight to less than 50% by weight. When the content is less than 10% by weight, sufficient cohesive force of the monoalkenyl aromatic compound polymer block cannot be obtained, and the softening point, toughness and tenacity sometimes may become insufficient. Also, if the content is 50% by weight or more, it may cause phase separation and periodical changes in softening point when made into an asphalt composition. The content is more preferably from 15 to 45% by weight, most preferably from 20 to 40% by weight. The content of monoalkenyl aromatic polymer block can be calculated by an oxidation decomposition method described below.

The vinyl bond content originated from the conjugated diene compound in the conjugated diene polymer block in the block copolymer composition of the present invention is 70% by weight or less. When the vinyl bond content is larger than 70% by weight, heat stability of the block copolymer is extremely deteriorated. Further, the low temperature characteristics of the resulting asphalt composition are also deteriorated. Preferred range of the vinyl bond content is from 5 to 60% by weight, more preferably from 8 to 50% by weight.

Melt viscosity (melt index, MI) of the block copolymer composition of the present invention is from 0.3 to 15.0 g/10 min as measured under the G condition (200° C., 5 kgf) in ASTM D 1238 (substantially the same condition as condition 8 in JIS K 7210). When the MI is less than 0.3 g/10 min, the melt viscosity of the asphalt mixture becomes too high and the workability therefore becomes poor. On the other hand, when the MI exceeds 15.0 g/10 min, the resulting workability may be excellent but the softening point becomes low so that the high degree asphalt-modifying effect of components (A) and (B) is not generated. The MI is preferably from 0.5 to 10.0 g/10 min, more preferably from 0.7 to 5.0 g/10 min.

The block copolymer composition of the present invention preferably has a softening temperature of from 80 to 130° C. as measured by a static thermomechanical analyzer (TMA). When the softening temperature is less than 80° C., the cohesive force may become insufficient, the high softening point of the asphalt composition may be not generated and its toughness and tenacity also may become poor. On the other hand, when the softening temperature exceeds 130° C., the melt viscosity of the asphalt composition may becomes too high so that the dispersion compatibility with asphalt may become poor and desirable physical effects therefore may be not generated. Its preferred range is from 85 to 125° C., more preferably from 90 to 120° C.

In addition, the copolymer composition of the present invention should have the following conditions.

The bulk density of the copolymer composition of the present invention is from 0.1 to 0.7. When the bulk density is lower than 0.1, the composition floats and is separated at the time of its dissolution in asphalt, which causes inferior solubility. It also is not efficient at the time of transportation. On the other hand, when the bulk density is larger than 0.7, it causes a difficulty in dissolving the composition because of its high degree aggregation and therefor a prolonged time is required for its dissolution. The bulk density is preferably from 0.2 to 0.5, more preferably from 0.25 to 0.4.

The copolymer composition of the present invention has a particle size distribution such that the content of constituents remaining on a 5-mesh sieve is not larger than 30% by weight. When the content of the constituents remaining on a 5-mesh sieve is larger than 30% by weight, the proportion of constituents having larger particle sizes increases so that solubility becomes poor. The content is preferably 20% by weight or less, more preferably 10% by weight or less.

Further, the content of constituents passing through a 20-mesh sieve is 30% by weight or less. When the content of the constituents passing through a 20-mesh sieve is larger than 30% by weight, the proportion of constituents having smaller particle sizes becomes too large so that aggregation of particles is apt to occur and a prolonged period of time is required for their dissolution. The content is preferably 10% by weight or less, more preferably 2% by weight or less. The sieves used in the present invention are those under Japanese Industrial Standard (JIS).

When the volume of pores existing in the copolymer composition of the present invention is measured, the total pore volume must be from 100 to 2,000 mm$^3$/g. If the total volume is less than 100 mm$^3$/g, incorporation of asphalt components becomes difficult due to less number of pores so that the dissolution time is prolonged. When it exceeds 2,000 mm$^3$/g, the number of pores becomes so large that the composition floats on the upper layer of asphalt at the time of dissolution, which therefore takes a prolonged period of time. The total pore volume is preferably from 120 to 1,500 mm$^3$/g, more preferably from 130 to 1,000 mm$^3$/g.

In addition, the copolymer composition of the present invention shows particularly excellent performance by the following modes.

That is, it is desirable that the block copolymer composition of the present invention has an alkenyl aromatic compound content (TS-BS), calculated by subtracting the monoalkenyl aromatic compound polymer block (BS) from the total bonding alkenyl aromatic compound content (TS), of from 2 to 30% by weight. When the content is less than 2% by weight, the effect of providing particularly excellent storage stability that is an objective of the present invention cannot be expected. On the other hand, when it is larger than 40% by weight, properties such as softening point are reduced. Its preferred range is from 3 to 25% by weight, more preferably from 4 to 20% by weight.

The amount of (TS-BS) can be controlled as follows. For example, the control can be made by polymerizing the block mainly comprising the conjugated diene by a process comprising charging a conjugated diene in a reactor and then gradually adding a monoalkenyl aromatic compound, or by a process comprising charging a conjugated diene and an alkenyl aromatic compound at the same time in a reactor and carrying out the polymerization in the presence of a randomization agent as needed and, as needed, while further adding the conjugated diene.

In this case, it is desirable that the monoalkenyl aromatic hydrocarbon content (TS) in the block copolymer composition of the present invention is from 12 to 50% by weight. When the monoalkenyl aromatic hydrocarbon content is less than 12% by weight, the cohesive force of the monoalkenyl aromatic hydrocarbon polymer block becomes insufficient and the mechanical strengths such as toughness and tenacity become poor. Also, the content exceeding 50% by weight is not desirable, because the storage stability is considerably deteriorated, the workability becomes poor due to prolonged period of dissolution dispersion time in asphalt in producing an asphalt mixture and the low temperature characteristics of the asphalt mixture becomes poor. The monoalkenyl aromatic hydrocarbon content (TS) is preferably from 15 to 45% by weight, more preferably from 20 to 40% by weight.

It is desirable that the content of the monoalkenyl aromatic compound polymer block (BS) in the block copolymer composition is from 10 to 48% by weight. When the content is less than 10% by weight, the cohesive force of the monoalkenyl aromatic compound block becomes insufficient and the softening point, toughness and tenacity become poor. On the other hand, when the content exceeds 48% by weight, phase separation and periodical changes in softening point occur. The content is preferably from 15 to 45% by weight, more preferably from 20 to 40% by weight.

The present invention provides a block copolymer composition for modifying asphalt and an asphalt composition modified using the same. When the asphalt composition contains from 2 to 15 parts by weight of the asphalt-modifying block copolymer composition comprising components (A) and (B) and from 85 to 97 parts by weight of asphalt, the effects of the present invention is effectively exerted. When the amount of the copolymer composition to be used in the modified asphalt composition is less than 2 parts by weight, satisfactory asphalt-modifying effect cannot be obtained. On the other hand, when it is used in an amount of exceeding 15 parts by weight, the melt viscosity of the asphalt composition becomes high so that not only workability is spoiled but also it is disadvantageous economically. Preferably, from 4 to 12 parts by weight of the copolymer composition is blended with from 88 to 96 parts by weight of asphalt.

The asphalt to be used in the present invention is not particularly limited, and the examples thereof include straight asphalt, (semi) blown asphalt and a mixture thereof. Preferred examples include straight asphalt having a penetration degree of from 40 to 120, blown asphalt having a penetration degree of from 10 to 30 and a mixture thereof.

Component (A) for use in the present invention can be obtained, for example, by a method in which styrene is polymerized using an organic lithium compound as an initiator and then butadiene alone is polymerized, a method in which polymerization is carried out by gradually adding styrene while butadiene is polymerized, a method in which a butadiene/styrene mixture is polymerized, the above-described methods in which the reaction is carried out in the presence of a polar compound as needed or the above-described methods further adding a conjugated butadiene as needed, to thereby form a butadiene polymer block or a styrene-butadiene copolymer block. Subsequently, the resulting butadiene polymer block or a styrene-butadiene copolymer block is polymerized with styrene again, and these operations are repeated as needed, to prepare component (A). In these operations, the peak molecular weight of component (A) as measured by GPC is generally controlled within the range of from $5 \times 10^4$ to $50 \times 10^4$ in terms of the standard polystyrene conversion basis by using a controlled amount of the organic lithium compound.

Component (B) for use in the present invention can be obtained, for example, by polymerizing styrene using an organic lithium compound as an initiator, forming a butadiene polymer block or a styrene-butadiene copolymer block by any one of the aforementioned methods, and then, as needed, further repeating these operations. The polymerization method of component (A) and that of component (B) are not necessarily the same. The organic lithium compound is used in such an amount that the peak molecular weight of component (B) as measured by GPC is controlled within the range of from ⅓ to ⅔ of the peak molecular weight of component (A).

After completion of the respective reactions, components (A) and (B) are treated with water, an alcohol or an acid to deactivate active species, and the solutions of the respective components are blended at a predetermined ratio and then subjected to treatment such as steam stripping to obtain the copolymer composition.

Alternatively, the block copolymer composition comprising components (A) and (B) for use in the present invention may be prepared as follows. A coupling reaction is carried out, after polymerization of component (B), by adding an appropriate coupling agent to the polymerization system in a predetermined amount based on the organic lithium compound, thereby obtaining the composition comprising the unreacted component (component (B)) and the component obtained by the coupling reaction of component (B) (component (A)). This method is industrially advantageous in comparison with the aforementioned methods.

After completion of the respective reactions, components (A) and (B) are treated with water, an alcohol or an acid to deactivate active species and then subjected to treatment such as steam stripping to obtain the copolymer composition.

Preferably, a bifunctional coupling agent is used as the coupling agent. Examples thereof include silicon halide compounds such as dichlorodimethylsilane and phenylmethyldichlorosilane, alkoxysilicon compounds such as dimethyldimethoxysilane, tin compounds such as dichlorodimethyltin, ester compounds such as methyl benzoate, vinylallenes such as divinylbenzene and a bifunctional epoxy compound.

It is possible to control the degree of randomness of the monoalkenyl aromatic compound in the conjugated diene block by adding a polar compound as a randomizing agent at the time of the polymerization of blocks in the block copolymers (A) and (B) containing a conjugated diene as the main component. For example, ethers or tertiary amines can be used as the polar compound. Specific examples thereof include ethylene glycol dimethyl ether, tetrahydrofuran, x-methoxytetrahydrofuran and N,N,N',N'-tetramethylethylenediamine, and tetrahydrofuran and N,N,N',N'-tetramethylethylenediamine are preferred. Such a polar compound can be used, for example, by adding it in a small amount to an inert hydrocarbon solvent such as n-hexane, cyclohexane, benzene, toluene and octane upon obtaining the polymers using an organic lithium compound as an initiator. Further, it is also possible to adjust randomness of butadiene and styrene by employing a method in which styrene is firstly charged instead of a butadiene/styrene mixture and then butadiene is gradually added.

Also, the vinyl bond content can be controlled by using a polar compound such as ethers and tertiary amines (e.g., ethylene glycol dimethyl ether, tetrahydrofuran, a-methoxytetrahydrofuran and N,N,N',N'-tetramethylethylenediamine, preferably tetrahydrofuran and N,N,N',N'-tetramethylethylenediamine) in an inert hydrocarbon solvent such as n-hexane, cyclohexane, benzene, toluene and octane upon obtaining the polymers using an organic lithium compound as an initiator.

As needed, stabilizers such as an antioxidant and a light stabilizer may be added to the composition of the present invention. Examples of the antioxidants include hindered phenol based antioxidants such as 2,6-di-t-butyl-4-methylphenol, n-octadecyl-3-(4'-hydroxy-3',5'-di-t-butylphenyl) propionate, 2,2'-methylenebis(4-methyl-6-t-butylphenol), 2,2'-methylenebis(4-ethyl-6-t-butylphenol), 2,4-bis[(octhylthio)methyl]-o-cresol, and 2-t-butyl-6-(3-t-butyl-2-hydroxy-5-methylbenzyl)-4-methylphenyl acrylate; sulfur based antioxidants such as dilaurylthio dipropionate, laurylstearylthio propionate, and pentaerythritol-tetrakis(β-laurylthio propionate); and phosphorus based antioxidants such as tris(nonylphenyl) phosphite and tris(2,4-di-t-butylphenyl) phosphite. Examples of the light stabilizer include benzotriazole based ultraviolet ray absorbing agents such as 2-(2'-hydroxy-5'-methylphenyl)benzotriazole, 2-(2'- hydroxy-3',5'-t-butylphenyl)benzotriazole, 2-(2'-hydroxy-3', 5'-di-t-butylphenyl)-5-chlorobenzotriazole, benzophenone based ultraviolet ray absorbing agents such as 2-hydroxy-4-methoxybenzophenone and hindered amine based light stabilizers.

After polymerization by the aforementioned method, the block copolymer composition of the present invention can be obtained by the following method. For example, hydrated state of the polymer (hydrated crumbs) obtained by steam stripping is extruded under a semi-melted condition while effecting dehydration using a screw type wringer, allowing the dehydrated matter to foam at the outlet of the wringer to have a predetermined foaming degree by controlling moisture, temperature and the like factors, and then cutting the resulting substance by a cutter blade that is installed at the outlet and adjusted to obtain a desired particle size, to thereby obtain porous pellets. As needed, the remaining moisture is evaporated using a hot air dryer to obtain the block copolymer composition of the present invention. Alternatively, the block copolymer composition of the present invention can be obtained by dehydrating the hydrated crumbs using a press type dehydrator, drying them under a semi-melted state, while effecting foaming if necessary, by adjusting temperature, time and water content with a hot air dryer, and then crudely pulverizing the dried product with a grinder. As another method, the block copolymer composition of the present invention can be obtained by drying the hydrated crumbs as it is by means of fluidized drying. In that case, a desired shape is obtained by controlling conditions such as temperature, agitation speed and agitation time at the time of steam stripping.

The mixing method for obtaining the asphalt composition of the present invention is not particularly limited, and it can be prepared by melt-kneading the block copolymer composition with the aforementioned various additive agents using a mixing machine such as a heat melting furnace, a roller, a kneader, Banbury mixer and an extruder.

In addition to the aforementioned stabilizers, the asphalt composition of the present invention if necessary may further contain various additives conventionally used in asphalt compositions. Examples thereof include fillers and reinforcing agents such as silica, talc, calcium carbonate, mineral matter powder and glass fiber; aggregate such as mineral matters; softening agents such as pigments and paraffinic, naphthenic or aromatic process oil; tackiness imparting resins such as coumarone-indene resins and terpene resins; foaming agents such as azodicarbonamide; polyolefinic or low molecular weight vinyl aromatic thermoplastic resins such as atactic polypropylene, and ethylene-ethyl acrylate copolymers; natural rubber; and synthetic rubbers such as polyisoprene rubbers, polybutadiene rubbers, styrene-butadiene rubbers, ethylene-propylene rubbers, chloroprene rubbers, acrylic rubbers, isoprene-isobutylene rubbers, polypentenamer rubbers, styrene-butadiene block copolymers other than those according to the present invention, styrene-isoprene block copolymers. Particularly, when used in road paving, the asphalt composition is generally mixed with aggregates such as mineral matter pebbles, sand and slugs.

EXAMPLES

The present invention will be described in greater detail below with reference to the following Examples and comparative Examples, but the invention should not be construed as being limited thereto. Various measurements were carried out in accordance with the following methods.

A: Physical property measurement of block copolymer composition

1) Total styrene content:
Calculated from the absorption strength at 262 nm using an ultraviolet ray spectrophotometer (Hitachi UV 200).

2) Block styrene content:
Obtained in accordance with an oxidation decomposition method by osmium tetraoxide and t-butyl hydroperoxide (described in *Journal of Polymer Science*, vol. 1, p. 429 (1946)). The weight of styrene polymer blocks was calculated from the absorption strength at 262 nm using an ultraviolet ray spectrophotometer (Hitachi UV 200).

3) Vinyl bond content in butadiene moiety:
Measured by the Hampton method (described in *Analytical Chemistry*, vol. 21, p. 943 (1943)) using an infrared spectrophotometer (Model 1710, manufactured by Perkin-Elmer Corp.).

4) Static thermomechanical analysis
Using a thermomechanical analyzer (TMA-40, manufactured by Shimadzu Corp.), changes in temperature of a sheet prepared by compression-molding each block copolymer sample into a thickness of 2 mm were measured by a penetration method using a quartz rod having a cylindrical tip of 0.5-mm pin diameter as the detection rod, and the temperature at which the penetration degree was abruptly changed was calculated by extrapolation and used as the softening temperature (load: 10 g, temperature rising rate: 5° C/min).

5) Peak molecular weight and composition ratio:
Peak molecular weight and composition ratio were calculated from chromatograms of a GPC analysis (carried out using an apparatus manufactured by Waters Associates, Inc. with a combination of three columns comprising two ZORBAX PSM 1000-S and one PSM 60-S all manufactured by Du Pont Company, using tetrahydrofuran as the solvent and under measurment conditions of 35° C. in temperature, 0.7 ml/min in flow rate, 0.1% by weight in sample concentration and 50 $\mu$l in injection volume). The peak molecular weight is a value converted from the following calibration curve of standard polystyrene (Waters Associates, Inc.). $1.75 \times 10^6$, $4.1 \times 10^5$, $1.12 \times 10^5$, $3.5 \times 10^4$, $8.5 \times 10^3$.

B: Physical property measurement of asphalt composition

1) Melt viscosity:
Measured using Brookfield rotational viscometer at 180° C.

2) Toughness and tenacity:
Measured in accordance with Test Methods for Pavement Construction (edited by Japan Road Construction Association).

3) Ductility, penetration and softening point:
Measured in accordance with JIS K 2207.

4) Phase separation
After preparation of an asphalt composition, it was allowed to stand for 2 days at 160° C. and the softening points of its upper and lower layers were measured to use the difference between them as phase separation degree.

5) Solubility in asphalt
During the process for dissolving in asphalt, the presence of undissolved matter was checked using a wire netting, and the solubility was judged by the asphalt dissolution time when undissolved matter disappeared.

C: Constitutional analysis of composition

1) Bulk density
Thoroughly dried polymer composition was weighed using a 100 cc container, and bulk density was calculated from the weight of 100 cc.

2) Particle size distribution

A 500-g portion of thoroughly dried polymer composition was sieved using a 5-mesh sieve and 20-mesh sieve piled one over the other, and the weight passed through the sieves and the weight remained thereon were respectively measured to calculate the distribution.

3) Total pore volume

Measured by the method of mercury penetration using a mercury porosimeter (Porosimeter Pascal 140 manufactured by Amco).

Example 1

The atmosphere in a 10 liter capacity stainless steel reaction vessel equipped with a jacket and an agitator was thoroughly replaced with nitrogen, the vessel was charged with 7,000 cc of cyclohexane, 1.41 g of tetrahydrofuran (THF), 0.6 g of N,N,N',N'-tetramethylethylenediamine (TMEDA) and 300 g of styrene (to be referred to as "first styrene" hereinafter), and the contents were set to about 70° C. by circulating hot water through the jacket.

Thereafter, polymerization of the first styrene was started by adding n-butyl lithium cyclohexane solution (1.8 g in pure content).

When the first styrene was completely polymerized, 700 g of butadiene (1,3-butadiene) was added to continue the polymerization and, when butadiene and styrene were polymerized almost completely, coupling reaction was carried out by adding a coupling agent. After addition of the coupling agent, 0.5 g of water was added. Starting immediate after charging of the first styrene, inside the reaction system was continuously stirred by the agitator until this stage.

Thereafter, the solution of block copolymer composition was taken out, 1.9 g of 2,6-di-t-butyl-4-methylphenol and 1.2 g of tris(nonylphenyl) phosphite were added to the solution and then the thus prepared solution was subjected to steam stripping to remove the solvent and obtain hydrated crumbs. Subsequently, the crumbs were dried by dehydration using a hot roller and then treated with a grinder to adjust to a predetermined particle size distribution, thereby obtaining a block copolymer composition. Conditions of these operations are summarized in Table 1-1.

The block copolymer composition obtained in this manner was analyzed by GPC, and the low molecular weight main component was named (B) and the high molecular weight main component was named (A). Their analytical values and physical properties are shown in Table 2-1.

Also, 6 g of the polymer composition was added to 100 g of straight asphalt (Sutoasu 60/80, manufactured by Nippon Oil Co., Ltd.), and the mixture was melt-kneaded at 180° C. to obtain an asphalt composition. The data regarding the characteristics, workability and the like of the asphalt composition are shown in Table 3-1.

Example 2

The atmosphere in a 10 liter capacity stainless steel reaction vessel equipped with a jacket and an agitator was thoroughly replaced with nitrogen, the vessel was charged with 7,000 cc of cyclohexane, 1.41 g of tetrahydrofuran, 0.6 g of N,N,N',N'-tetramethylethylenediamine and 200 g of styrene (to be referred to as "first styrene" hereinafter), and the contents were set to about 70° C. by circulating hot water through the jacket.

Thereafter, polymerization of the first styrene was started by adding n-butyl lithium cyclohexane solution (1.4 g in pure content). When the first styrene was completely polymerized, 700 g of butadiene (1,3-butadiene) and 100 g of styrene (to be referred to as "second styrene" hereinafter) were added to continue the polymerization and, when butadiene was polymerized almost completely, coupling reaction was carried out by adding a coupling agent.

After addition of the coupling agent, 0.4 g of water was added. Starting immediate after charging of the first styrene, inside the reaction system was continuously stirred by the agitator until this stage. Thereafter, the solution of block copolymer composition was taken out, 1.9 g of 2,6-di-t-butyl-4methylphenol and 1.2 g of tris(nonylphenyl) phosphite were added to the solution and then the thus prepared solution was subjected to steam stripping to remove the solvent and obtain hydrated crumbs. Subsequently, dehydration drying was carried out using a 30 mm extruder equipped with a vent. In this case, a predetermined particle size distribution was obtained by adjusting the cutter. By further carrying out hot air drying, the desired block copolymer composition was obtained. Conditions of these operations are summarized in Table 1-1.

The block copolymer composition obtained in this manner was analyzed by GPC, and the low molecular weight main component was named (B) and the high molecular weight main component was named (A). Their analytical values and physical properties are shown in Table 2-1.

Also, 6 g of the polymer composition was added to 100 g of straight asphalt (Sutoasu 60/80, manufactured by Nippon Oil Co., Ltd.), and the mixture was melt-kneaded at 1800C to obtain an asphalt composition. The data regarding the characteristics, workability and the like of the asphalt composition are shown in Table 3-1.

Example 3

The atmosphere in a 10 liter capacity stainless steel reaction vessel equipped with a jacket and an agitator was thoroughly replaced with nitrogen, the vessel was charged with 7,000 cc of cyclohexane, 1.41 g of tetrahydrofuran, 0.6 g of N,N,N',N'-tetramethylethylenediamine and 150 g of styrene (to be referred to as "first styrene" hereinafter), and the contents were set to about 70° C. by circulating hot water through the jacket. Thereafter, polymerization of the first styrene was started by adding n-butyl lithium cyclohexane solution (1.64 g in pure content). When the first styrene was completely polymerized, 850 g of butadiene (1,3-butadiene) was added to continue the polymerization and, when butadiene was polymerized almost completely, coupling reaction was carried out by adding a coupling agent.

After addition of the coupling agent, 0.4 g of water was added. Starting immediate after charging of the first styrene, inside the reaction system was continuously stirred by the agitator until this stage. Thereafter, the solution of block copolymer composition was taken out, 1.9 g of 2,6-di-t-butyl-4-methylphenol and 1.2 g of tris(nonylphenyl) phosphite were added to the solution and then the thus prepared solution was subjected to steam stripping to remove the solvent and obtain hydrated crumbs. Subsequently, dehydration was carried out using a press type dehydrator and then drying was carried out using a dryer. This was to a grinder to adjust to a predetermined particle size distribution, thereby obtaining a block copolymer composition. Conditions of these operations are summarized in Table 1-1.

The block copolymer composition obtained in this manner was analyzed by GPC, and the low molecular weight main component was named (B) and the high molecular weight main component was named (A). Their analytical values and physical properties are shown in Table 2-1.

Also, 6 g of the polymer composition was added to 100 g of straight asphalt (Sutoasu 60/80, manufactured by Nippon Oil Co., Ltd.), and the mixture was melt-kneaded at 180° C. to obtain an asphalt composition. The data regarding the characteristics, workability and the like of the asphalt composition are shown in Table 3-1.

Examples 4 to 17 and Comparative Examples 1 to 8

Inventive Examples 4 to 17 and Comparative Examples 1 to 8 were carried out under the same conditions of Inventive Example 1, except for the conditions shown in Tables 1-1 to 1-3. Analytical values and physical properties of the block copolymer compositions obtained in this manner are shown in Tables 2-1 to 2-3. Also, evaluation of asphalt compositions was carried out using the same asphalt described in Inventive Example 1 and by the same asphalt blending ratio and blending method of Inventive Example 1. The results are shown in Tables 3-1 to 3-4.

Production Example 1

Production method of block copolymer component (A),

The atmosphere in a 10 liter capacity stainless steel reaction vessel equipped with a jacket and an agitator was thoroughly replaced with nitrogen, the vessel was charged with predetermined amounts of cyclohexane, tetrahydrofuran, N,N,N',N'-tetramethylethylenediamine and styrene (to be referred to as "first styrene" hereinafter), and the contents were set to about 70° C. by circulating hot water through the jacket. Thereafter, polymerization of the first styrene was started by adding a predetermined amount of n-butyl lithium cyclohexane solution. When the first styrene was completely polymerized, predetermined amounts of butadiene (1,3-butadiene) and styrene (to be referred to as "second styrene" hereinafter) were added to continue the polymerization, when butadiene was completely polymerized, a predetermined amount of styrene (to be referred to as "third styrene" hereinafter) was further added to continue the polymerization and then, when the third styrene was completely polymerized, active species were completely deactivated by adding water.

Thereafter, 2,6-di-t-butyl-4-methylphenol and tris(nonylphenyl) phosphite (cyclohexane solution) were added. Conditions of these operations are summarized in Table 1-4.

Production Example 2

Production method of block copolymer component (B):

The atmosphere in a 10 liter capacity stainless steel reaction vessel equipped with a jacket and an agitator was thoroughly replaced with nitrogen, the vessel was charged with predetermined amounts of cyclohexane, tetrahydrofuran, N,N,N',N'-tetramethylethylenediamine and styrene (to be referred to as "first styrene" hereinafter), and the contents were set to about 70° C. by circulating hot water through the jacket. Thereafter, polymerization of the first styrene was started by adding a predetermined amount of n-butyl lithium cyclohexane solution. When the first styrene was completely polymerized, predetermined amounts of butadiene (1,3-butadiene) and styrene (to be referred to as "second styrene" hereinafter) were added to continue the polymerization and then, when butadiene and the second styrene were completely polymerized, active species were completely deactivated by adding water.

Thereafter, 2,6-di-t-butyl-4-methylphenol and tris(nonylphenyl) phosphite (cyclohexane solution) were added. Conditions of these operations are summarized in Table 1-4.

Example 18

Polymer solutions of components (A) and (B) obtained by the just described methods were mixed at a predetermined composition ratio, and the thus prepared solution was subjected to steam stripping to remove the solvent and obtain hydrated crumbs. The crumbs were subsequently dehydrated and dried using a hot roller and then treated with a grinder to adjust to a predetermined particle size distribution, thereby obtaining a block copolymer composition. Physical properties of this block copolymer composition are shown in Table 2-3. The block copolymer composition obtained in this manner was made into an asphalt composition using the same asphalt described in Inventive Example 1 by the same blending amount. Its physical properties are shown in Table 3-4.

Production Example 3

The atmosphere in a 10 liter capacity stainless steel reaction vessel equipped with a jacket and an agitator was thoroughly replaced with nitrogen, the vessel was charged with 7,000 cc of cyclohexane, 1.41 g of tetrahydrofuran, 0.6 g of N,N,N',N'-tetramethylethylenediamine and 220 g of styrene (to be referred to as "first styrene" hereinafter), and the contents were set to about 70° C. by circulating hot water through the jacket. Thereafter, polymerization of the first styrene was started by adding n-butyl lithium cyclohexane solution (1.4 g in pure content).

When the first styrene was completely polymerized, 680 g of butadiene (1,3-butadiene) and 100 g of styrene (to be referred to as "second styrene" hereinafter) were added to continue the polymerization and then, when butadiene was polymerized almost completely, a coupling agent was added to effect coupling.

After addition of the coupling agent, 0.5 g of water was added. Starting immediate after charging of the first styrene, inside the reaction system was continuously stirred by the agitator until this stage. Thereafter, the solution of block copolymer composition was taken out, and 1.9 g of 2,6-di-t-butyl-4-methylphenol and 1.2 g of tris(nonylphenyl) phosphite were added to the solution.

Example 19

The solution obtained in Production Example 3 was subjected to steam stripping to remove the solvent and obtain hydrated crumbs which were subsequently dehydrated and dried using a 30 mm extruder equipped with a vent. In this case, a predetermined particle size distribution was obtained by adjusting the cutter. By further carrying out hot air drying, the desired block copolymer composition was obtained. The block copolymer composition obtained in this manner was analyzed by GPC, and the low molecular weight main component was named (B) and the high molecular weight main component was named (A). Their physical properties are shown in Table 2-3.

Also, 6 g of the polymer composition was added to 100 g of straight asphalt (Sutoasu 60/80, manufactured by Nippon Oil Co., Ltd.), and the mixture was melt-kneaded at 180° C. to obtain an asphalt composition. Characteristics of the asphalt composition are shown in Table 3-4.

Examples 20 to 23 and Comparative Examples 9 and 10

In Inventive Examples 20 to 23 and Comparative Examples 9 and 10, similar to the case of Inventive Example 19, the solution obtained in Production Example 3 was made into powder by the method shown in Tables 1-5 to 1-6, and 6 g of the polymer composition was added to 100 g of straight asphalt (Sutoasu 60/80, manufactured by Nippon Oil Co., Ltd.), and the mixture was melt-kneaded at 180° C. to obtain an asphalt composition. Analytical values of the polymer composition are shown in Table 2-4, and characteristics of the asphalt composition are shown in Table 3-5.

Comparative Example 11

The solution obtained in Production Example 3 was subjected to steam stripping to remove the solvent, and the thus obtain hydrated crumbs were dehydrated and dried using a hot air dryer to obtain dry crumbs from which moisture was substantially completely removed. Thereafter, the dry crumbs were melt-extruded using a 30 mm extruder to obtain pellets. Analytical data of the pellets are shown in Table 2-4. Also, 6 g of the polymer composition was added to 100 g of straight asphalt (Sutoasu 60/80, manufactured by Nippon Oil Co., Ltd.), and the mixture was melt-kneaded at 180° C. to obtain an asphalt composition. The data regarding the characteristics, workability and the like of the asphalt composition are shown in Table 3-5.

Comparative Example 12

The solution obtained in Production Example 3 was subjected to steam stripping to remove the solvent, and the thus obtain hydrated crumbs were dehydrated and dried using a hot air -dryer to obtain dry crumbs. Analytical data of the crumbs are shown in Table 2-4. Also, 6 g of the polymer composition was added to 100 g of straight asphalt (Sutoasu 60/80, manufactured by Nippon Oil Co., Ltd.), and the mixture was melt-kneaded at 180° C. to obtain an asphalt composition. The data regarding the characteristics, workability and the like of the asphalt composition are shown in Table 3-5.

Comparative Example 13

The pellets obtained in Comparative Example 10 were made into a sheet by press molding. By cutting the sheet, a sample was obtained. Analytical data of the sample are shown in Table 2-4. Also, 6 g of the sample was added to 100 g of straight asphalt (Sutoasu 60/80, manufactured-by Nippon Oil Co., Ltd.), and the mixture was melt-kneaded at 180° C. to obtain an asphalt composition. Characteristics of the asphalt composition are shown in Table 3-5.

The coupling agents shown in Tables 1-1 to 1-4 below are as follows.

Formula 1:

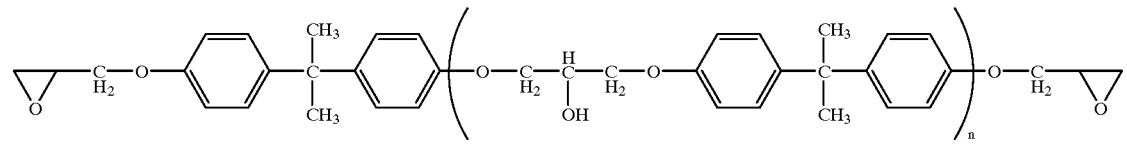

Formula 2:

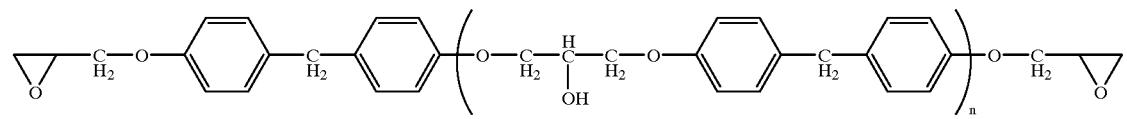

TABLE 1

| | Inventive Example | | | | | | | | |
|---|---|---|---|---|---|---|---|---|---|
| Example No. | 1 | 2 | 3 | 4 | 5 | 6 | 7 | 8 | 9 |
| THF (g) | 1.41 | 1.41 | 1.41 | 1.41 | 1.41 | 1.41 | 1.41 | 1.41 | 1.41 |
| TMEDA (g) | 0.6 | 0.6 | 0.6 | 0.6 | 0.6 | 0.6 | 0.6 | 0.6 | 0.6 |
| Styrene (1) (g) | 300 | 200 | 150 | 220 | 380 | 450 | 200 | 200 | 200 |
| Butyl lithium (g) | 1.81 | 1.41 | 1.64 | 2 | 2.12 | 2.38 | 1.25 | 1.41 | 1.56 |
| Styrene (2) (g) | 0 | 100 | 0 | 0 | 0 | 0 | 210 | 130 | 130 |
| Butadiene (g) | 700 | 700 | 850 | 780 | 620 | 550 | 590 | 670 | 670 |
| Coupling agent *) | ZX | ZX | PMDCS | PMDCS | ZX | DMDMS | DMDMS | DMDMS | ZX |
| Amount added (g) | 3.23 | 2.51 | 2.3 | 2.53 | 3.35 | 0.78 | 6.3 | 3.97 | 2.38 |
| Styrene (3) (g) | 0 | 0 | 0 | 0 | 0 | 0 | 0 | 0 | 0 |
| Drying method | Roller | Extruder | Press | Roller | Roller | Roller | Press | Press | Press |

| | Inventive Example | | | | | | | |
|---|---|---|---|---|---|---|---|---|
| Example No. | 10 | 11 | 12 | 13 | 14 | 15 | 16 | 17 |
| THF (g) | 1.41 | 1.41 | 1.41 | 1.41 | 1.41 | 1.41 | 0 | 1.41 |
| TMEDA (g) | 0 | 0.6 | 0.6 | 0.6 | 0.6 | 0.9 | 0 | 0.6 |
| Styrene (1) (g) | 200 | 250 | 220 | 180 | 150 | 200 | 200 | 250 |
| Butyl lithium (g) | 1.56 | 1.64 | 1.54 | 1.26 | 1.37 | 1.39 | 1.31 | 1.51 |
| Styrene (2) (g) | 100 | 30 | 80 | 150 | 270 | 100 | 150 | 100 |
| Butadiene (g) | 700 | 720 | 700 | 670 | 580 | 700 | 650 | 650 |
| Coupling agent *) | ZX | PMDCS | PMDCS | PMDCS | ZX | ZX | ZX | PMDCS |
| Amount added (g) | 2.78 | 1.84 | 1.84 | 1.32 | 2.44 | 2.48 | 2.17 | 1.69 |
| Styrene (3) (g) | 0 | 0 | 0 | 0 | 0 | 0 | 0 | 0 |
| Drying method | Press | Press | Extruder | Extruder | Extruder | Extruder | Extruder | Extruder |

TABLE 1-continued

|  | Inventive Example Comparative Example | | | | | | | |
|---|---|---|---|---|---|---|---|---|
| Example No. | 1 | 2 | 3 | 4 | 5 | 6 | 7 | 8 |
| THF (g) | 1.41 | 1.41 | 1.41 | 1.41 | 1.41 | 1.41 | 1.41 | 1.41 |
| TMEDA (g) | 0.6 | 0.6 | 0.6 | 0.6 | 0.6 | 1.5 | 0.6 | 0.6 |
| Styrene (1) (g) | 80 | 530 | 250 | 200 | 250 | 250 | 100 | 105 |
| Butyl lithium (g) | 1.56 |  | 1.75 | 1.31 | 2.22 | 1.35 | 0.85 | 0.86 |
| Styrene (2) (g) | 0 | 0 | 50 | 100 | 100 | 50 | 500 | 110 |
| Butadiene (g) | 920 | 470 | 700 | 700 | 650 | 700 | 400 | 680 |
| Coupling agent *) | PMDCS | PMDCS | PMDCS | PMDCS | PMDCS | PMDCS | PMDCS | — |
| Amount added (g) | 1.98 | 0.7 | 0.26 | 1.17 | 1.66 | 1.41 | 0.89 | — |
| Styrene (3) (g) | 0 | 0 | 0 | 0 | 0 | 0 | 0 | 105 |
| Drying method | Roller | Roller | Roller | Press | Press | Press | Extruder | Extruder |

|  | Production Example | | Inventive Example | | Production Example |
|---|---|---|---|---|---|
| Example No. | 1 | 2 | 18 |  | 3 |
| THF (g) | 1.4 | 1.4 | — |  | 1.41 |
| TMEDA (g) | 0.7 | 0.7 | — |  | 0.6 |
| Styrene (1) (g) | 125 | 250 | — |  | 220 |
| Butyl lithium (g) | 0.8 | 1.4 | — |  | 1.41 |
| Styrene (2) (g) | 50 | 50 | — |  | 100 |
| Butadiene (g) | 700 | 700 | — |  | 680 |
| Coupling agent *) | — | — | — |  | PMDCS |
| Amount added (g) | — | — | — |  | 1.47 |
| Styrene (3) (g) | 125 | — | — |  | 0 |
| Drying method | — | — | Roller |  | — |

| Inventive Example | 19 | 20 | 21 | 22 | 23 |
|---|---|---|---|---|---|
| Dehydration drying method | Extruder | Extruder | Roller | Roller | Press |

| Comparative Example | 9 | 10 | 11 | 12 | 13 |
|---|---|---|---|---|---|
| Dehydration drying method | Press | Press | Extruder | Hot air drying only | Cutting after melt pressing |

TABLE 2

|  | Inventive Example | | | | | | | | |
|---|---|---|---|---|---|---|---|---|---|
| Example No. | 1 | 2 | 3 | 4 | 5 | 6 | 7 | 8 | 9 |
| TS (%) | 30 | 30 | 15 | 22 | 38 | 45 | 41 | 33 | 33 |
| BS (%) | 30 | 20 | 15 | 22 | 38 | 45 | 20 | 20 | 20 |
| TS-BS (%) | 0.0 | 12.5 | 0 | 0.0 | 0.0 | 0.0 | 26.3 | 16.3 | 16.3 |
| Molecular weight of (A) ($\times 10^4$) | 15.9 | 20.9 | 19.9 | 15.6 | 13.2 | 11.2 | 21.7 | 20.4 | 18.2 |
| Molecular weight of (B) ($\times 10^4$) | 8.0 | 10.4 | 10.0 | 7.8 | 6.0 | 5.6 | 10.9 | 10.2 | 9.1 |
| (B)/(A) | 1/2 | 1/2 | 1/2 | 1/2 | 1/2 | 1/2 | 1/2 | 1/2 | 1/2 |
| Component (B) content (%) | 30 | 30 | 6 | 15 | 38 | 70 | 50 | 75 | 40 |
| MI (g/10 min) | 2 | 2 | 0.5 | 7 | 3 | 8 | 8 | 13 | 13 |
| Vinyl bond content (%) | 37 | 35 | 35 | 36 | 36 | 38 | 35 | 38 | 40 |
| TMA softening temperature (° C.) | 107 | 101 | 87 | 91 | 111 | 113 | 106 | 101 | 97 |
| Bulk density | 0.35 | 0.34 | 0.36 | 0.33 | 0.34 | 0.35 | 0.33 | 0.33 | 0.36 |
| Particle size distribution, remained on 5-mesh sieve | 1 | 3 | 3 | 2 | 3 | 3 | 5 | 8 | 7 |
| Particle size distribution, passed through 20-mesh sieve | 5 | 3 | 5 | 4 | 5 | 7 | 11 | 13 | 14 |
| Total pore volume (mm³/g) | 320 | 513 | 380 | 371 | 610 | 580 | 601 | 543 | 481 |

|  | Inventive Example | | | | | | | |
|---|---|---|---|---|---|---|---|---|
| Example No. | 10 | 11 | 12 | 13 | 14 | 15 | 16 | 17 |
| TS (%) | 30 | 28 | 30 | 33 | 42 | 30 | 35 | 35 |
| BS (%) | 20 | 25 | 22 | 18 | 15 | 20 | 20 | 25 |
| TS-BS (%) | 12.5 | 4.0 | 10.3 | 18.3 | 31.8 | 12.5 | 18.8 | 13.3 |
| Molecular weight of (A) ($\times 10^4$) | 19.2 | 18.2 | 18.9 | 22.9 | 19.9 | 20.9 | 21.8 | 18.6 |
| Molecular weight of (B) ($\times 10^4$) | 9.6 | 9.1 | 9.5 | 11.4 | 10.0 | 10.5 | 10.9 | 9.3 |
| (B)/(A) | 1/2 | 1/2 | 1/2 | 1/2 | 1/2 | 1/2 | 1/2 | 1/2 |
| Component (B) content (%) | 30 | 25 | 20 | 30 | 10 | 30 | 35 | 25 |
| MI (g/10 min) | 2 | 0.5 | 3 | 1 | 12 | 3 | 1.5 | 3 |
| Vinyl bond content (%) | 15 | 35 | 37 | 36 | 33 | 40 | 10 | 38 |

TABLE 2-continued

| | | | | | | | | |
|---|---|---|---|---|---|---|---|---|
| TMA softening temperature (° C.) | 97 | 104 | 101 | 101 | 90 | 102 | 104 | 107 |
| Bulk density | 0.33 | 0.35 | 0.36 | 0.36 | 0.36 | 0.35 | 0.34 | 0.34 |
| Particle size distribution, remained on 5-mesh sieve | 6 | 5 | 7 | 6 | 5 | 18 | 16 | 17 |
| Particle size distribution, passed through 20-mesh sieve | 12 | 12 | 0 | 0 | 0 | 0 | 0 | 0 |
| Total pore volume (min/g) | 393 | 501 | 340 | 280 | 360 | 293 | 286 | 415 |

| | Comparative Example | | | | | | | | Inventive Ex. | |
|---|---|---|---|---|---|---|---|---|---|---|
| Example No. | 1 | 2 | 3 | 4 | 5 | 6 | 7 | 8 | 18 | 19 |
| TS (%) | 8 | 53 | 30 | 30 | 35 | 30 | 60 | 32 | 30 | 32 |
| BS (%) | 8 | 53 | 25 | 20 | 25 | 25 | 10 | 21 | 25 | 22 |
| TS-BS (%) | 0.0 | 0.0 | 6.7 | 12.5 | 13.3 | 6.7 | 55.6 | 13.9 | 6.7 | 12.8 |
| Molecular weight of (A) ($\times 10^4$) | 22.4 | 6.4 | 17.0 | 22.3 | 13.0 | 21.9 | 28.7 | 17.1 | 18.3 | 20.4 |
| Molecular weight of (B) ($\times 10^4$) | 11.2 | 3.2 | 8.5 | 11.2 | 6.5 | 11.0 | 14/3 | — | 9.5 | 10.2 |
| (B)/(A) | 1/2 | 1/2 | 1/2 | 1/2 | 1/2 | 1/2 | 1/2 | — | 1/2 | 1/2 |
| Component (B) content (%) | 15 | 45 | 90 | 40 | 50 | 30 | 20 | 0 | 20 | 30 |
| MI (g/10 min) | 1 | 7 | 15 | 0.1 | 20 | 2 | 5 | 0.5 | 1.5 | 2 |
| Vinyl bond content (%) | 30 | 30 | 30 | 35 | 30 | 78 | 30 | 10 | 30 | 38 |
| TMA softening temperature (° C.) | 59 | 135 | 96 | 99 | 87 | 107 | 76 | 95 | 100 | 99 |
| Bulk density | 0.34 | 0.35 | 0.33 | 0.34 | 0.34 | 0.34 | 0.33 | 0.33 | 0.34 | 0.28 |
| Particle size distribution, remained on 5-mesh sieve | 1 | 2 | 4 | 8 | 7 | 8 | 9 | 9 | 1 | 20 |
| Particle size distribution, passed through 20-mesh sieve | 4 | 3 | 8 | 13 | 14 | 14 | 15 | 0 | 4 | 0 |
| Total pore volume (mm³/g) | 304 | 412 | 434 | 387 | 493 | 483 | 150 | 190 | 387 | 180 |

| | Inventive Example | | | | Comparative Example | | | | |
|---|---|---|---|---|---|---|---|---|---|
| Example No. | 20 | 21 | 22 | 23 | 9 | 10 | 11 | 12 | 13 |
| Bulk density | 0.33 | 0.35 | 0.37 | 0.48 | 0.28 | 0.27 | 0.65 | 0.4 | 0.38 |
| Particle size distribution, remained on 5-mesh sieve | 5 | 1 | 10 | 10 | 5 | 0 | 2 | 80 | 25 |
| Particle size distribution, passed through 20-mesh sieve | 0 | 5 | 3 | 15 | 40 | 80 | 2 | 5 | 10 |
| Total pore volume (mm³/g) | 380 | 503 | 340 | 420 | 280 | 267 | 94 | 150 | 70 |

TABLE 3

| | Inventive Example | | | | | | | |
|---|---|---|---|---|---|---|---|---|
| Example No. | 1 | 2 | 3 | 4 | 5 | 6 | 7 | 8 |
| Melt viscosity (cps) | 211 | 268 | 309 | 182 | 161 | 104 | 240 | 175 |
| Softening point (° C.) | 83 | 80 | 83 | 80 | 81 | 80 | 79 | 75 |
| Penetration | 50 | 53 | 57 | 53 | 54 | 52 | 4.6 | 49 |
| Ductility at 15° C. (cm) | 119 | 105 | 118 | 101 | 113 | 103 | 94 | 88 |
| Toughness (kg.cm) | 256 | 248 | 147 | 187 | 291 | 367 | 320 | 321 |
| Tenacity (kg.cm) | 161 | 171 | 83 | 115 | 190 | 256 | 243 | 250 |
| Softening point after 3 days | | | | | | | | |
| Phase separation, upper layer (° C.) | 85 | 82 | 83 | 80 | 80 | 80 | 81 | 77 |
| Phase separation, lower layer (° C.) | 79 | 79 | 83 | 78 | 75 | 72 | 76 | 72 |
| Dissolution time (hr) | 2.5 | 2.3 | 1.7 | 1.6 | 2.4 | 2.8 | 2.7 | 2.2 |

| | Inventive Example | | | | | | |
|---|---|---|---|---|---|---|---|
| Example No. | 9 | 10 | 11 | 12 | 13 | 14 | 15 |
| Melt viscosity (cps) | 179 | 225 | 287 | 267 | 282 | 184 | 262 |
| Softening point (° C.) | 71 | 80 | 84 | 82 | 86 | 78 | 82 |
| Penetration | 47 | 49 | 55 | 54 | 52 | 39 | 54 |
| Ductility at 15° C. (cm) | 95 | 70 | 118 | 119 | 120 | 76 | 125 |
| Toughness (kg.cm) | 290 | 201 | 230 | 256 | 271 | 264 | 275 |
| Tenacity (kg.cm) | 213 | 110 | 148 | 178 | 192 | 195 | 191 |
| Softening point after 3 days | | | | | | | |
| Phase separation, upper layer (° C.) | 73 | 81 | 83 | 83 | 88 | 86 | 84 |
| Phase separation, lower layer (° C.) | 73 | 75 | 76 | 81 | 81 | 83 | 81 |
| Dissolution time (hr) | 2.1 | 2.6 | 2.7 | 2.5 | 2.8 | 2.6 | 2.4 |

TABLE 3-continued

|  | Inventive Ex. | | Comparative Example | | | | |
| --- | --- | --- | --- | --- | --- | --- | --- |
| Example No. | 16 | 17 | 1 | 2 | 3 | 4 | 5 |
| Melt viscosity (ops) | 240 | 237 | 345 | 166 | 176 | 322 | 151 |
| Softening point (° C.) | 80 | 81 | 67 | 65 | 56 | 85 | 62 |
| Penetration | 50 | 52 | 56 | 48 | 49 | 55 | 41 |
| Ductility at 15° C. (cm) | 100 | 119 | 101 | 83 | 58 | 119 | 42 |
| Toughness (kg.cm) | 252 | 279 | 99 | 227 | 113 | 262 | 144 |
| Tenacity (kg.cm) | 180 | 190 | 55 | 114 | 55 | 185 | 83 |
| Softening point after 3 days | | | | | | | |
| Phase separation, upper layer (° C.) | 86 | 87 | 67 | 65 | 56 | 84 | 62 |
| Phase separation, lower layer (° C.) | 80 | 83 | 67 | 45 | 54 | 75 | 60 |
| Dissolution time (hr) | 2.9 | 2.5 | 2.2 | 3.5 | 2.3 | 3.6 | 2.1 |

|  | Comparative Example | | | Inventive Ex. | |
| --- | --- | --- | --- | --- | --- |
| Example No. | 6 | 7 | 8 | 18 | 19 |
| Melt viscosity (cps) | 219 | 381 | 293 | 249 | 255 |
| Softening point (° C.) | 78 | 86 | 88 | 81 | 83 |
| Penetration | 64 | 35 | 44 | 52 | 53 |
| Ductility at 15° C. (cm) | 219 | 89 | 43 | 100 | 122 |
| Toughness (kg.cm) | 140 | 161 | 82 | 260 | 295 |
| Tenacity (kg.cm) | 102 | 87 | 41 | 138 | 175 |
| Softening point after 3 days | | | | | |
| Phase separation, upper layer (° C.) | gelled | 89 | 89 | 81 | 83 |
| Phase separation, lower layer (° C.) | gelled | 72 | 79 | 79 | 77 |
| Dissolution time (hr) | 2.3 | 3 | 3.1 | 4 | 2.5 |

|  | Inventive Example | | | | Comparative Example | | | | |
| --- | --- | --- | --- | --- | --- | --- | --- | --- | --- |
| Example No. | 20 | 21 | 22 | 23 | 9 | 10 | 11 | 12 | 13 |
| Melt viscosity (cps) | 254 | 255 | 255 | 256 | 255 | 255 | 254 | 254 | 253 |
| Softening point (° C.) | 83 | 83 | 83 | 83 | 81 | 80 | 82 | 81 | 81 |
| Penetration | 53 | 53 | 53 | 53 | 51 | 51 | 52 | 52 | 53 |
| Ductility at 15° C. (cm) | 122 | 122 | 122 | 122 | 123 | 124 | 125 | 124 | 123 |
| Toughness (kg.cm) | 295 | 294 | 290 | 297 | 290 | 288 | | | |
| Tenacity (kg.cm) | 180 | 182 | 179 | 179 | 166 | 169 | 170 | 168 | 169 |
| Softening point after 3 days | | | | | | | | | |
| Phase separation, upper layer (° C.) | 84 | 85 | 84 | 83 | 81 | 80 | 82 | 81 | 80 |
| Phase separation, lower layer (° C.) | 76 | 79 | 77 | 78 | 66 | 67 | 70 | 71 | 69 |
| Dissolution time (hr) | 2.5 | 3 | 3 | 3 | >5 | >5 | >5 | >5 | >5 |

It is evident from these tables that the asphalt composition modified with a block copolymer having certain specific range of structure shows high softening point, high 60° C. viscosity, excellent ductility and high toughness and tenacity and is also excellent in storage stability. It can be also understood that, when compared with the compositions of Comparative Examples, those of Inventive Examples are superior in terms of storage stability when initial stage softening point is identical and of initial stage softening point when storage stability is identical. Since the asphalt composition of the present invention is excellent in physical properties such as mechanical strength, softening point and ductility, has highly balanced workability and also is excellent in storage stability, it can be used not only for road paving but also in various applications such as waterproof sheets, sound insulation sheets, cut-off sheets and the like, so that the present invention is largely meaningful in industrial viewpoints.

While the invention has been described in detail and with reference to specific examples thereof, it will be apparent to one skilled in the art that various changes and modifications can be made therein without departing from the spirit and scope thereof.

What is claimed is:

1. An asphalt composition comprising: from 3 to 15 parts by weight of a block copolymer mixture for modifying asphalt which comprises a mixture of (A) a block copolymer comprising:
   at least two polymer blocks each mainly comprising a monoalkenyl aromatic compound: and
   at least one polymer block mainly comprising a conjugated diene compound; and (B) a block copolymer comprising:
   at least one polymer block mainly comprising a monoalkenyl aromatic compound; and
   at least one copolymer block mainly comprising a conjugated diene compound, and having a peak average molecular weight equivalent to ⅓ to ⅔ of the peak average molecular weight of block copolymer (A)

wherein (a) the total bonding alkenyl aromatic compound content in the mixture of block copolymers (A) and (B) is from 10 to 50% by weight, wherein (b) the vinyl bond content in the conjugated diene polymer blocks is not greater than 70% by weight, and wherein the block copolymer composition has:

(c) a content of (A) component is from 98 to 20% by weight and a content of (B) component is from 2 to 80% by weight;

(d) a melt index value of from 0.3 to 15.0 a/10 min;

(e) a bulk density of from 0.1 to 0.7;
(f) a particle size distribution such that the content of constituents remaining on a 5-mesh sieve is not greater than 30% by weight and the content of constituents passing through a 20-mesh sieve is not greater than 30% by weight; and
(g) a total pore volume of from 100 to 2,000 mm$^3$/g; and from 85 to 97 parts by weight of asphalt.

2. The asphalt composition according to claim 1, wherein the block copolymer mixture has a softening temperature of from 80 to 130° C. as measured by static thermomechanical analysis (TMA).

3. The asphalt composition according to claim 1, wherein the block copolymer mixture has a content of the monoalkenyl aromatic compound polymer blocks (BS) of from 10 to 48% by weight, and an alkenyl aromatic compound content (TS-BS) calculated by subtracting the monoalkenyl aromatic compound polymer block content (BS) from the total bonding alkenyl aromatic compound content (TS) is from 2 to 30% by weight.

4. The asphalt composition according to claim 1, wherein component (A) comprises a coupling polymer obtained by coupling reaction of component (B).

* * * * *